United States Patent [19]

Kawamura

[11] 4,155,430
[45] May 22, 1979

[54] NOISE PREVENTING MEANS FOR DISC BRAKES

[75] Inventor: Kouji Kawamura, Susono, Japan

[73] Assignee: Toyota Jidosha Kogyo Kabushiki Kaisha, Toyota, Japan

[21] Appl. No.: 897,597

[22] Filed: Apr. 19, 1978

Related U.S. Application Data

[63] Continuation of Ser. No. 756,975, Jan. 5, 1977, abandoned.

[30] Foreign Application Priority Data

May 19, 1976 [JP] Japan ............................. 51/63807[U]

[51] Int. Cl.² ............................................. F16D 65/00
[52] U.S. Cl. ................................................. 188/73.5
[58] Field of Search ................ 188/73.5, 205 A, 73.1, 188/250 B

[56] References Cited

U.S. PATENT DOCUMENTS

| | | | |
|---|---|---|---|
| 3,113,643 | 12/1963 | Botterill | 188/72.5 |
| 3,477,551 | 11/1969 | Beuchle et al. | 188/250 B |
| 3,563,347 | 2/1971 | Hahm | 188/73.1 |
| 3,684,061 | 8/1972 | Ogawa et al. | 188/73.5 |

FOREIGN PATENT DOCUMENTS

| | | | |
|---|---|---|---|
| 2031517 | 1/1971 | Fed. Rep. of Germany | 188/73.5 |
| 2058045 | 7/1971 | Fed. Rep. of Germany | 188/73.5 |
| 2236536 | 2/1974 | Fed. Rep. of Germany | 188/73.1 |

*Primary Examiner*—George E. A. Halvosa
*Attorney, Agent, or Firm*—Browdy and Neimark

[57] ABSTRACT

A noise or squeal preventing device for use in disc brakes of the type in which a friction pad is urged into engagement with a rotatable disc by a piston, working in an hydraulic cylinder of which the axis is substantially at right angles to the plane of the disc, in order to stop or decellerate the rotation of the disc, which noise preventing device including (a) a pair of shims or plate members, inserted between the friction pad and the piston with the object of preventing the noise which may occur when the brake is applied, one of which shims being partially cut out at a location wherein the same confronts with the inner end or the thrust giving end of the piston on that side of the axis of the piston with which any given point on the disc first comes into alignment and the other shim having no such a cut-out portion, and (b) a lubricating material such as grease applied at least between the pair of shims.

11 Claims, 12 Drawing Figures

(a) WITH NO SHIM
(b) WITH TWO NON-CUTOUT SHIMS
(c) WITH A SINGLE CUT-OUT SHIM
(d) WITH INVENTED SHIMS

← SQUEAL OCCURRING RATE %

FIG. 10 FIG. 11
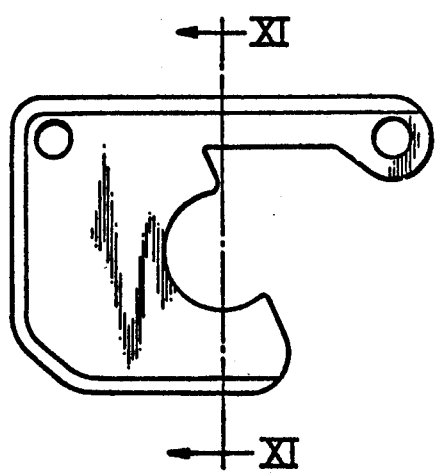
FIG. 12
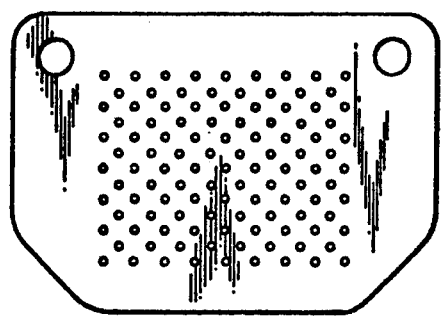

NOISE PREVENTING MEANS FOR DISC BRAKES

This is a continuation of application Ser. No. 756,975 filed Jan. 5, 1977, now abandoned.

BACKGROUND OF THE INVENTION

This invention relates to a brake noise preventing means used in disc brakes, more particularly to an improvement of a brake noise preventing means of the type wherein a plate member or members are inserted between the friction pad and the piston which urges the former.

In disc brakes of the kind in which a friction pad is urged into engagement with a rotating disc, by a piston reciprocating in an hydraulic cylinder, in order to stop or decellerate the rotation of the disc, unpleasant or disagreeable noises occur in not a few cases. Among these a noise named a squeal is the most unpleasant, and preventive attempts of the noise have long been done without attaining a perfect solution thereof.

An idea of inserting a plate member or members (hereinafter simply referred to as a shim or shims) between the friction pad and the piston for preventing or reducing this noise belongs to a series of attempts abovementioned, and U.S. Pat. No. 3,113,643, for example, is widely known as a representative invention for its excellent effect. This invention is characterized in that a so-called cut-out shim is inserted between the friction pad and the piston, which shim being partially cut out as an aperture (at a location wherein the inner end of the piston would normally abut the same on that side of the axis of the piston with which any given point on the disc first comes into alignment). Since then many disclosures have been made to improve the noise preventing effect by means of varying the size, location, and configuration of the cut-out portion of the shim or shims. A method of inserting a couple of so-called non-cut-out shims is also known. Further study of improving the noise preventing means of this type is, however, greatly needed to attain a better one.

For the purpose of better understanding of this invention a few of the recent examples will be cited hereunder: (a) inserting three laminated shims, i.e., three shims superposed one on the other with the central one having an aperture which contains lubricating grease therein (Japanese laid open Utility Model, numbered Sho-50-118382); (b) inserting two superposed shims, with one adjacent to the piston having a concaved groove facing the other shim on the friction pad side, in which groove lubricating grease is contained (Japanese laid open Utility Model, numbered Sho-50-118383); (c) inserting a shim, circular in shape and having a cut-out portion, so as to be pivoted on the friction pad wherein the pad abuts the piston for being able to vary the location of the cut-out portion (Japanese laid open Utility Model, numbered Sho-50-118388); and (d) inserting a shim tightly fixed to the backing plate of the friction pad for containing a lubricant, such as grease therein (Japanese laid open Utility Model Sho-50-142978).

SUMMARY OF THE INVENTION

This invention resembles in a sense these disclosures in that it also inserts a shim or shims between the friction pad and the piston to urge the former. The present invention has been, however, developed, aiming at a completion of the noise preventing means of this type, based on a new fact discovered after a number of experiments and supported by many positive data obtained in the experiments.

The primary object of this invention is to provide a unique and highly effective noise preventing means (a) including a pair of shims, one of which being provided with a cut-out portion and the other having no such cut-out portion, inserted between the friction pad and the piston for urging the former against the disc, and (b) containing a lubricating material at least between both shims.

BRIEF DESCRIPTION OF THE DRAWING

FIG. 10 is an elevational view of a cut-out shim having a slightly elevated place near the peripheral portion thereof processed by pressing;

FIG. 11 is a cross-sectional view taken along the line XI—XI of FIG. 10; and

FIG. 12 is an elevational view of a non-cutout shim having a plurality of small holes processed thereon.

DETAILED DESCRIPTION OF THE PREFERRED EMBODIMENTS

Figure 1:
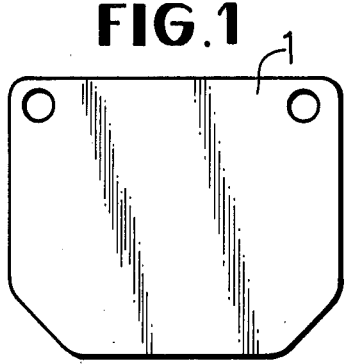
FIG. 1 is an elevational view of a non-cutout shim used in an embodiment of the present invention.
Figure 2:
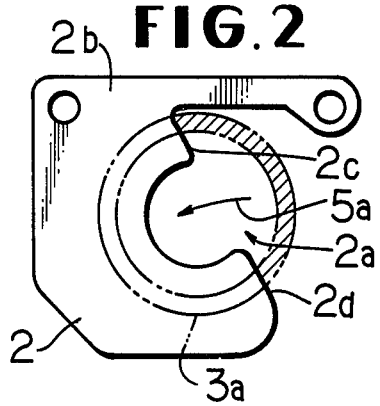
FIG. 2 is an elevational view of a type of the cut-out shim used in an embodiment of the present invention.
Figure 3:
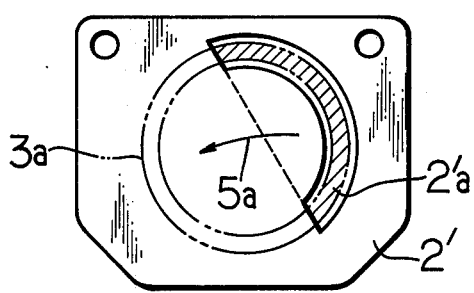
FIG. 3 is an elevational view of another type of the cut-out shim.
Figure 4:
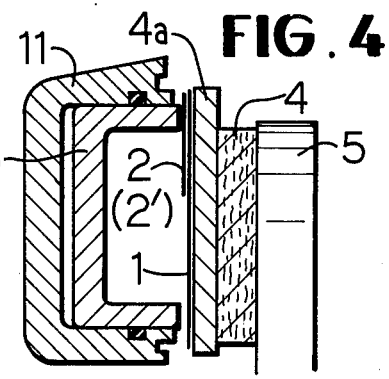
FIG. 4 is a vertical sectional view of an essential part of an embodiment of the present invention wherein the abovementioned elements are incorporated.

A disc brake wherein a non-cutout shim 1, having no cut-out portion shown in FIG. 1, and either of a cut-out shim 2 in FIG. 2 or a cut-out shim 2' in FIG. 3 are combined in a way illustrated in FIG. 4 to be inserted, between the friction pad 4 and the piston 3 working in the cylinder 11, with some grease applied between both shims, proves to be extremely highly effective in the noise prevention.

A first cut-out shim 2 is provided with a cut-out portion 2a, which is not an aperture but a cut-away portion as to cut off a part of the edge thereof as shown in FIG. 2, while a second cut-out shim 2' has a cut-out portion 2'a defined by an arc and a chord, which is not an open one like the shim 2 but an aperture surrounded by the remainder, as shown in FIG. 3. Both the first and second shims 2, 2' are alike in being cut out a portion thereof, a hatched arcuate part of the circular area shown with double-dot chain lines in FIGS. 2 and 3, which circular area corresponding to the thrust giving end 3a or inner end of the piston 3. Each cut-out portion includes a line or demarcation, such as 2c, 2d in FIG. 2, which passes that side of the axis of the piston where the rotating disc first comes around and is inclined from a line passing through the axes of the piston 3 and disc 5 as can readily be determined from FIGS. 2–4. Furthermore, the shims are movably supported relative to each other, the piston and the friction pad and are supported by means extending through the apertures shown in the figures thereby requiring no securement to one another. The hatched arcuate area is located on that side of the axis of the piston 3 wherein the rotating disc 5 first comes around or enters; an arrow mark 5a in the FIGS. 2 and 3 denotes the rotating direction of the disc 5.

Figure 5:
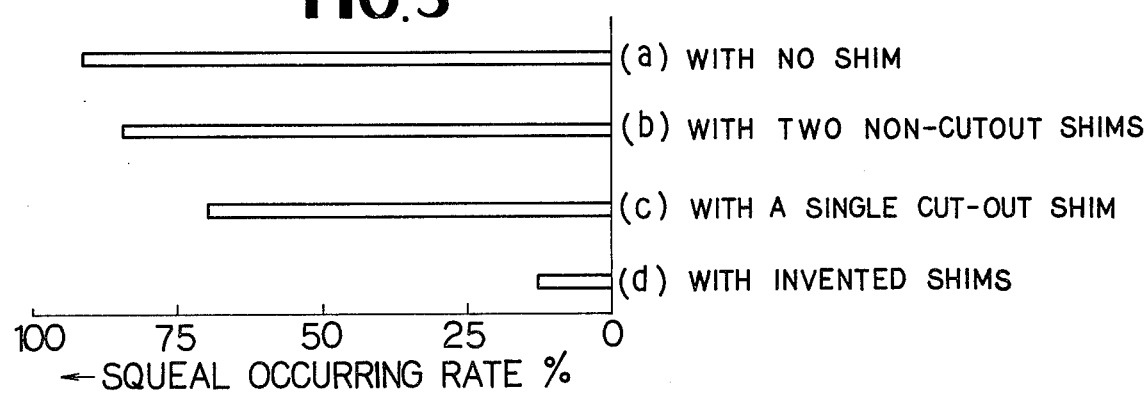
FIG. 5 is a graph showing the result of experiments measuring the noise preventing effect of the means shown in FIG. 4 in comparison with other samples.

Concerning a typical combination of shims, composed of the shim 1 (non-cutout shim) and either of the shim 2 (partially cut-out shim) or the shim 2' (apertured shim) inserted between the friction pad 4 and the piston 3 as shown in FIG. 4 in a closely superposed state, one on the other which combination being applied with a lubricant, such as grease between the rear side of the backing plate 4a of the friction pad 4 and the shim 1 as well as between the shim 1 and the shim 2 (or the shim 2') — this type of combined shims hereinafter referred to as "invented shim" —, an experimental data of the noise preventing effect is shown in the graph of FIG. 5.

FIG. 5 shows the effect of the invented shim (d) in comparison with samples of (a) having no shim; (b) having two of non-cutout shims; and (c) having a single cut-out shim. As clearly observed on the graph the invented shim indicates an extremely good result, viz. the lowest percentage of squeal occurring rate.

A presumed reasoning for the experimentally proved excellent effect of the noise prevention will be described as follows: Insertion of cut-out shim 2 — representing both shims 2 and 2' description will be made only on shim 2, as the same description holds true also on shim 2' — between piston 3 and backing plate 4a of friction pad 4 alters the combined rigidity of piston 3 and friction pad 4, and thereby produces an effect of positively restraining the vibration of disc 5 and that of piston 3 in cylinder 11. On the other hand, an undesirable effect of inserting cut-out shim 2 is thought to reside in extremely raising the surface pressure in the vicinity of the border line or demarcation line 2c and 2d between the solid part 2b and the cut off part 2a, which in turn negatively affects in regard to the noise prevention to produce an increase of frictional force between piston 3 and cut-out shim 2 as well as between cut-out shim 2 and friction pad 4. This seems to diminish the noise preventing effect of the cut-out shim in the conventional noise preventing means against expectation.

It is presumed that the insertion of non-cutout shim 1 in this embodiment between cut-out shim 2 and friction pad 4 reduces the local rising of the surface pressure and hence decreases the frictional force between non-cutout shim 1 and friction pad 4. Rightness of this presumption or assumption is yet to be studied irrespective of the actual proof of the excellent effect of noise prevention in FIG. 5 shown in the present invention characterized in the insertion of a cut-out shim and a non-cutout shim between the friction pad and the piston.

It is preferable, furthermore, to lay a lubricant, grease in a stable or well preserved state between friction pad 4 and non-cutout shim 1 as well as between non-cutout shim and cut-out shim 2, a few embodiments of which being disclosed hereunder.

Figures 6, 7, 8, 9:
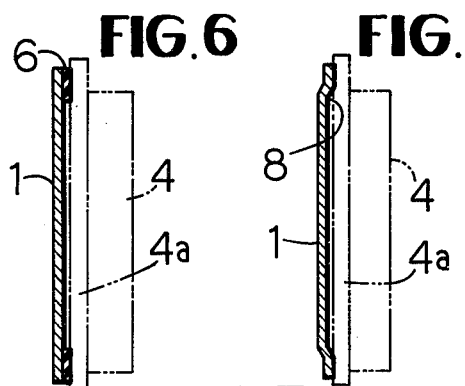
FIGS. 6 and 7 are respectively a side sectional view of a non-cutout shim used in another embodiment.
FIG. 8 is a side sectional view of a friction pad in still another embodiment.
FIG. 9 is a side sectional view of a non-cutout shim and a cut-out shim used in further another embodiment.

In FIG. 6 an embodiment is illustrated wherein non-cutout shim 1 is thinly coated with a friction reducing material such as Teflon as a peripheral circular coating band 6, which prevents the grease retained between backing plate 4a of friction pad 4 and non-cutout shim 1 from escaping out when the brake is applied.

FIG. 7 shows another embodiment in which non-cutout shim 1 is provided with a shallow concave 8 in the center thereof for retaining the lubricant, grease by a process of pressing to form a circular step.

The above description made solely on non-cutout shim 1 can be similarly applied to either of cut-out shims 2 and 2'. It is required, however, to avoid carrying out the procedure in the neighborhood of the engagement area with piston 3, for preventing interference therewith.

A portion of backing plate 4a of friction pad 4 may be concaved into a recess 9 for retaining the grease as shown in FIG. 8.

It is also feasible to make a concave 10 in non-cutout shim 1 at a location corresponding to the cut-out portion 2'a of the cut-out shim 2' as can be seen in FIG. 9 for retaining the grease therein.

In case of retaining a lubricant, such as grease between backing plate 4a and non-cutout shim 1, for example in FIG. 6 or 7, backing plate 4a shall be preferably finished smoothly flat. It is also recommendable to provide a plurality of small holes or tiny apertures in non-cutout shim 1 for constantly supplying the grease between the same and cut-out shim 2 and 2' as a useful way to keep the noise preventing effect for a long period of time.

It will be obvious to those skilled in the art that various changes may be made without departing from the scope of the invention and the invention is not to be considered limited to what is shown in the drawings and described in the specification.

What is claimed is:

1. A noise preventing arrangement for disc brakes of the type in which a friction pad is urged into engagement with a rotatable disc by a piston, working in a hydraulic cylinder of which the axis is substantially at right angles to the plane of said disc, in order to stop or decelerate the rotation of said disc, which noise preventing arrangement comprises (a) a pair of substantially flat shims or plate members, one of which is a cut-out shim partially cut out completely therethrough at a location wherein the same confronts with the inner end or thrust giving end of said piston on that side of the axis of the piston where the rotating disc comes around, said cut-out shim being cut out along a line passing that side of the axis of the piston where the rotating disc comes around and inclined from a line passing through the axes of the piston and the disc in the direction of disc rotation, the other shim being a shim having no cut-out portion movably inserted between said friction pad and said piston in a superposed state, said cut-out shim being positioned on the other shim and nearer side to said piston, and (b) a lubricating material retained at least between said pair of substantially flat shims, said cut-out shim and said other shim being unsecured to one another.

2. A noise preventing arrangement as set forth in claim 1, wherein said shim having no cut-out portion is thinly coated partially on the surface thereof with a friction reducing material, circularly with a constant width to form a circular coated band.

3. A noise preventing arrangement as set forth in claim 1, wherein said partially cut-out shim is thinly coated on the surface thereof with a friction reducing material to form a coated band having a certain width at a portion near the periphery while avoiding the area in which the piston abuts the same.

4. A noise preventing arrangement as set forth in claim 1, wherein said shim having no cut-out portion is slightly set back in the central greater part by means of pressing process to form a step between the peripheral portion and the remainder.

5. A noise preventing arrangement as set forth in claim 1, wherein said partially cut-out shim is processed by means of pressing to reserve a slightly elevated place near the peripheral portion thereof, except for the portion in which the piston abuts the shim, in order to form a small step between said peripheral portion and the remainder.

6. A noise preventing arrangement as set forth in claim 1, wherein said shim having no cut-out portion is processed by means of pressing to form a concave for retaining a lubricating material at a location in which the same confronts with the cut-out portion of said cut-out shim in such a way as not to interfere with said piston.

7. A noise preventing arrangement as set forth in claim 1, wherein said shim having no cut-out portion is provided with a certain suitable number of small holes for communicating said lubricating material.

8. A noise preventing arrangement as set forth in claim 1, wherein said friction pad includes a backing plate positioned adjacent said other shim with its rear side in contact therewith, and a small portion of the rear side of said backing plate is concaved for retaining a lubricating material, and wherein said cut-out shim and said other shim are unsecured to said backing plate.

9. A noise preventing arrangement as set forth in claim 1, wherein said lubricating material is grease.

10. A noise preventing arrangement as set forth in claim 1, wherein said cut-out portion is an aperture defined by an arc and a chord.

11. A noise preventing arrangement as set forth in claim 10, wherein said cut-out portion is a cut-away portion as to cut off a part of the edge of said aperture.

* * * * *